(12) United States Patent
Mukherjee

(10) Patent No.: US 8,423,461 B2
(45) Date of Patent: Apr. 16, 2013

(54) ADVANCED PAYMENT MANAGEMENT SYSTEM

(75) Inventor: Partha Mukherjee, San Jose, CA (US)

(73) Assignee: EBay Inc., San Jose, CA (US)

( * ) Notice: Subject to any disclaimer, the term of this patent is extended or adjusted under 35 U.S.C. 154(b) by 0 days.

(21) Appl. No.: 13/100,462

(22) Filed: May 4, 2011

(65) Prior Publication Data

US 2012/0284177 A1 Nov. 8, 2012

(51) Int. Cl.
*G06Q 40/00* (2012.01)

(52) U.S. Cl.
USPC .............................................. 705/40; 705/35

(58) Field of Classification Search ............... 705/40, 705/35
See application file for complete search history.

(56) References Cited

U.S. PATENT DOCUMENTS

| | | | |
|---|---|---|---|
| 6,732,919 B2 * | 5/2004 | Macklin et al. | 235/380 |
| 7,401,731 B1 * | 7/2008 | Pletz et al. | 235/380 |
| 8,078,528 B1 * | 12/2011 | Vicente et al. | 705/38 |
| 2002/0116331 A1 * | 8/2002 | Cataline et al. | 705/39 |

OTHER PUBLICATIONS

PR_Newswire, "Vodafone and T-Mobile Announce Interoperable Mobile Payment Platform Initiative"; Mar. 14, 2002, Newswire, Supplier No. 83758446.*

Miranda, Mario J; Konya, Laszlo, "Are supermarket shoppers attracted to specialty merchandise rewards"; 2008, ISSN: 0263-4503, v26n1, pp. 43-59.*

Gann, Roger, "Alternative payment systems Lines of credit"; Jan. 2002; Internet Magazine, p. 102(5), ISSN: 1355-6428.*

* cited by examiner

*Primary Examiner* — Lalita M Hamilton
*Assistant Examiner* — Edward Chang
(74) *Attorney, Agent, or Firm* — Haynes and Boone, LLP

(57) ABSTRACT

The present disclosure involves a method that involves: receiving a request to pay a bill having a billing date; identifying a plurality of funding instruments available for paying the bill; retrieving respective billing cycles of the funding instruments; and recommending one of the funding instruments to pay the bill based on the billing date of the bill and the respective billing cycles of the funding instruments. The present disclosure also involves a system that involves: means for receiving a request to make a payment, the payment having a payment deadline; means for identifying a plurality of different funding sources; means for retrieving billing period information associated with each funding source; and means for recommending using one of the funding sources to make the payment, wherein the means for recommending includes means for comparing the payment deadline with the respective billing period information of the funding sources.

20 Claims, 5 Drawing Sheets

ADVANCED PAYMENT MANAGEMENT SYSTEM

BACKGROUND

1. Technical Field

The present disclosure generally relates to managing payments online and, more particularly, to selecting an optimal funding instrument for bill payment.

2. Related Art

Online transactions are becoming more and more prevalent, with an ever-increasing number of online entities that may or may not have a physical real world counterpart. Furthermore, the services offered by these online entities have been improving as well. The popularity of online transactions is partially attributable to the ease and convenience of making a transaction online instead of at a physical location. A common online shopper may have a plurality of different funding instruments available to pay for his or her purchases. For example, the shopper may have credit cards and/or debit cards that are issued by different banks. The credit/debit cards may also be different types of cards (e.g., a VISA® debit card or an AMERICAN EXPRESS® credit card). These funding instruments may have different billing cycles. Unfortunately, neither the shoppers themselves nor the online shopping sites may take these different billing cycles into consideration. Instead of recommending a particular funding instrument to the shoppers, an online shopping site often times just allows the shoppers to randomly choose any one of the funding instruments to pay a particular bill. As such, the randomly-chosen funding instrument may not be the best suited funding instrument for paying the bill. For example, the shoppers may not be able to take advantage of free working capital and may miss an opportunity to enhance their credit scores.

Therefore, while existing online payment mechanisms have been generally adequate for their intended purposes, they have not been entirely satisfactory in every aspect. It would be advantageous to recommend or automatically select an optimal funding instrument to a user based on the billing cycles of all of the user's available funding instruments.

SUMMARY

One of the broader forms of the present disclosure involves a method of performing financial transactions. The method involves: receiving a request to pay a bill, the bill having a billing date; identifying a plurality of funding instruments available for paying the bill; retrieving respective billing cycles of the funding instruments; and recommending one of the funding instruments to pay the bill, wherein the recommending is carried out at least in part based on the billing date of the bill and the respective billing cycles of the funding instruments.

Another one of the broader forms of the present disclosure involves an apparatus comprising a non-transitory, tangible computer readable storage medium storing a computer program. The computer program has instructions that when executed, perform: receiving a request to pay a bill, the bill having a billing date; identifying a plurality of funding instruments available for paying the bill; retrieving respective billing cycles of the funding instruments; and recommending one of the funding instruments to pay the bill, wherein the recommending is carried out at least in part based on the billing date of the bill and the respective billing cycles of the funding instruments.

Yet another one of the broader forms of the present disclosure involves a system. The system involves: means for receiving a request to make a payment, the payment having a payment deadline; means for identifying a plurality of different funding sources; means for retrieving billing period information associated with each funding source; and means for recommending using one of the funding sources to make the payment, wherein the means for recommending includes means for comparing the payment deadline with the respective billing period information of the funding sources.

BRIEF DESCRIPTION OF THE DRAWINGS

FIG. 2 illustrates a simplified example of an online merchant's user interface at a payment-management phase.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

Figure 1:
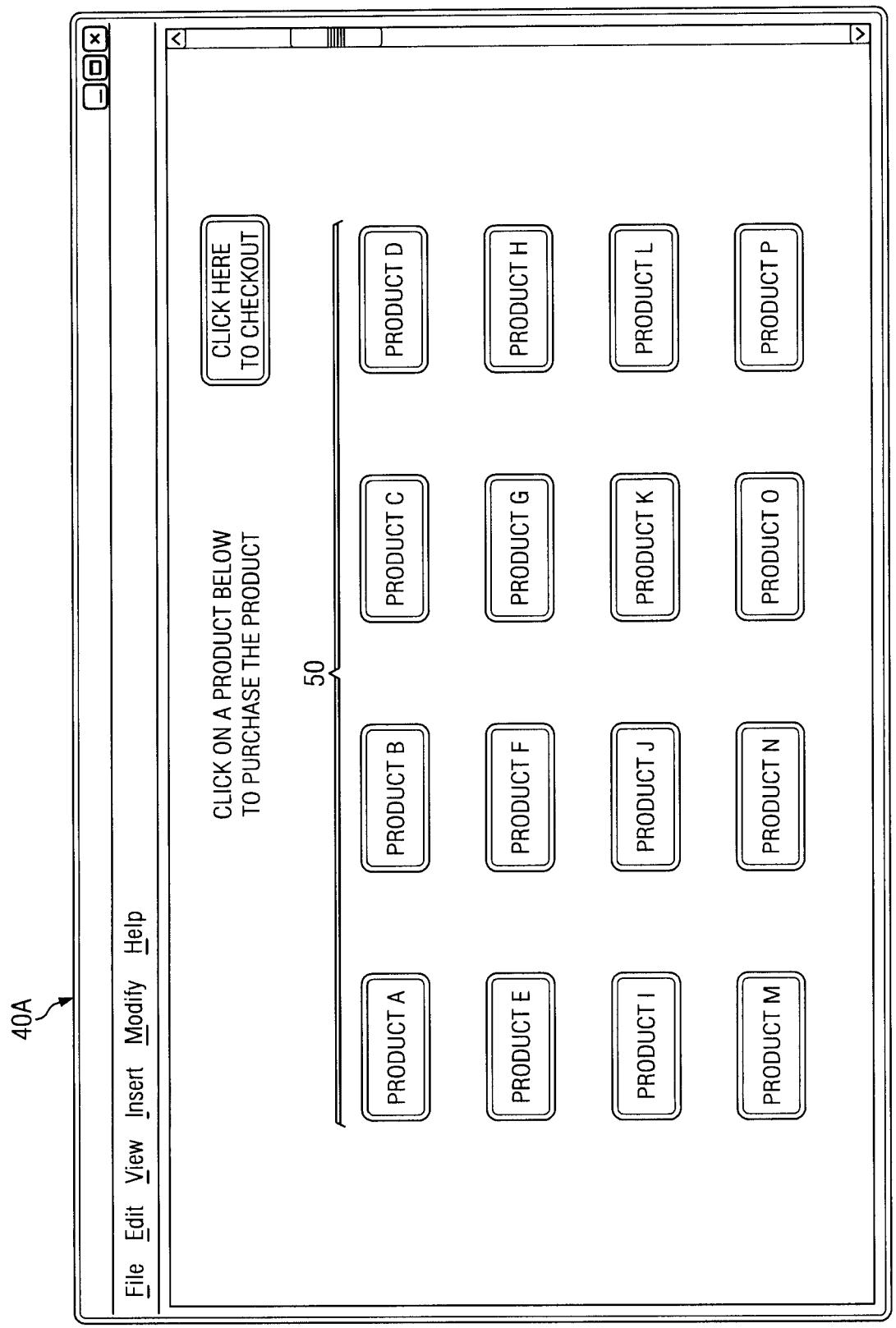
FIG. 1 illustrates a simplified example of an online merchant's user interface at a production selection phase.

FIG. 1 illustrates an example user interface 40A from a merchant. The merchant is engaged in the selling of products (goods), where product or good is used herein to include physical goods, digital goods, services, charitable donations, etc. In an embodiment, the merchant is an online merchant that sells products through a website, and the user interface 40A is in the form of a web page. The user interface 40A is in a product-selection phase and displays a plurality of objects 50 that each represent a different product. The objects 50 may each contain a button, an icon, a picture, or combinations thereof. In another embodiment, the merchant sells products at a physical point of sale, such as a store or kiosk. In this embodiment, the user may select physical products to be scanned at the point of sale.

The products represented by the objects 50 may include physical and tangible goods, including (but not limited to) clothing, electronics, tools, toys, household appliances, books, movies, automotive components, sporting goods, groceries, etc. The products represented by the objects 50 may also include digital goods, which include goods that are stored, delivered, and/or used in an electronic format. As non-limiting examples, digital goods may include electronic-books, digital music files, digital images, digital videos, and virtual items, etc. Similar to physical and tangible goods, digital goods can be bought and sold between interested parties. The buyer of a digital good may receive the purchased digital good through an email attachment, a download, or other suitable mechanisms.

As is illustrated in FIG. 1, the user interface 40A informs a prospective buyer what products are available from the merchant. To initiate the purchasing process, the prospective buyer may click on any one of the objects 50 to add it to the buyer's purchasing queue, which may be in the form of a virtual shopping cart. The prospective buyer may edit the purchasing queue at any time, such as adding or subtracting the quantity of a particular product in the queue or removing a product from the queue altogether. For the sake of simplicity, the details of the purchasing queue are not illustrated herein.

Figure 2:
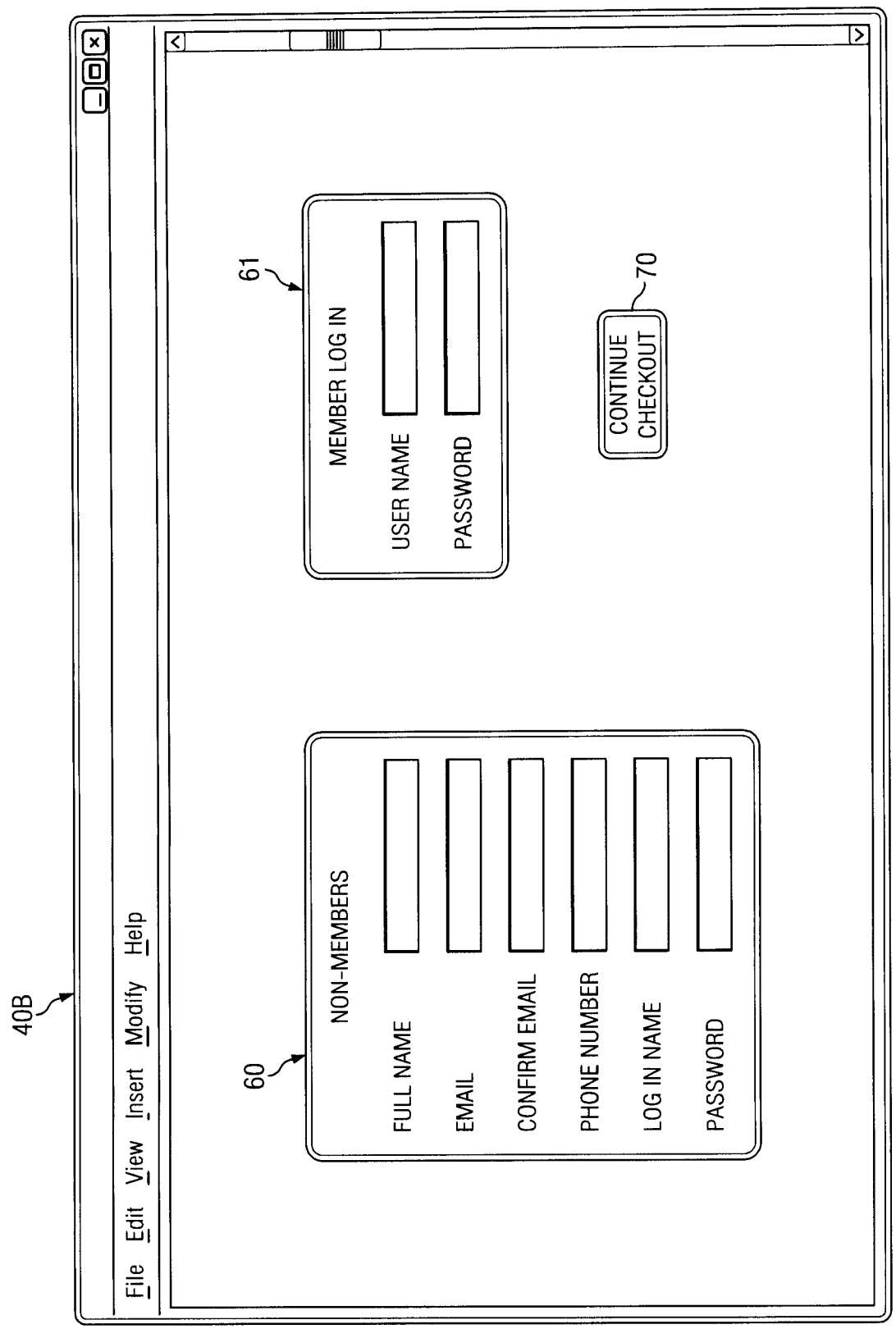
FIG. 2 illustrates a simplified example of an online merchant's user interface at a check-out phase.

FIG. 2 illustrates an example of a user interface 40B in a check-out phase of the transaction. In the check-out phase, the prospective buyer has tentatively decided on what goods he would like to purchase from the merchant and is trying to complete the transaction. The user interface 40B contains two sections 60 and 61 in the embodiment shown in FIG. 2. The section 60 is reserved for non-members of the merchant's website. Therefore, the non-members may need to register with the website by supplying personal information such as full name, email address, phone number, intended user name (login name) and password. For regular (returning) members of the website, they only need to provide the user name and the password before proceeding to check out. The prospective buyer may click on a "continue checkout" button 70 to initiate the next step in the checkout process.

Figure 3:
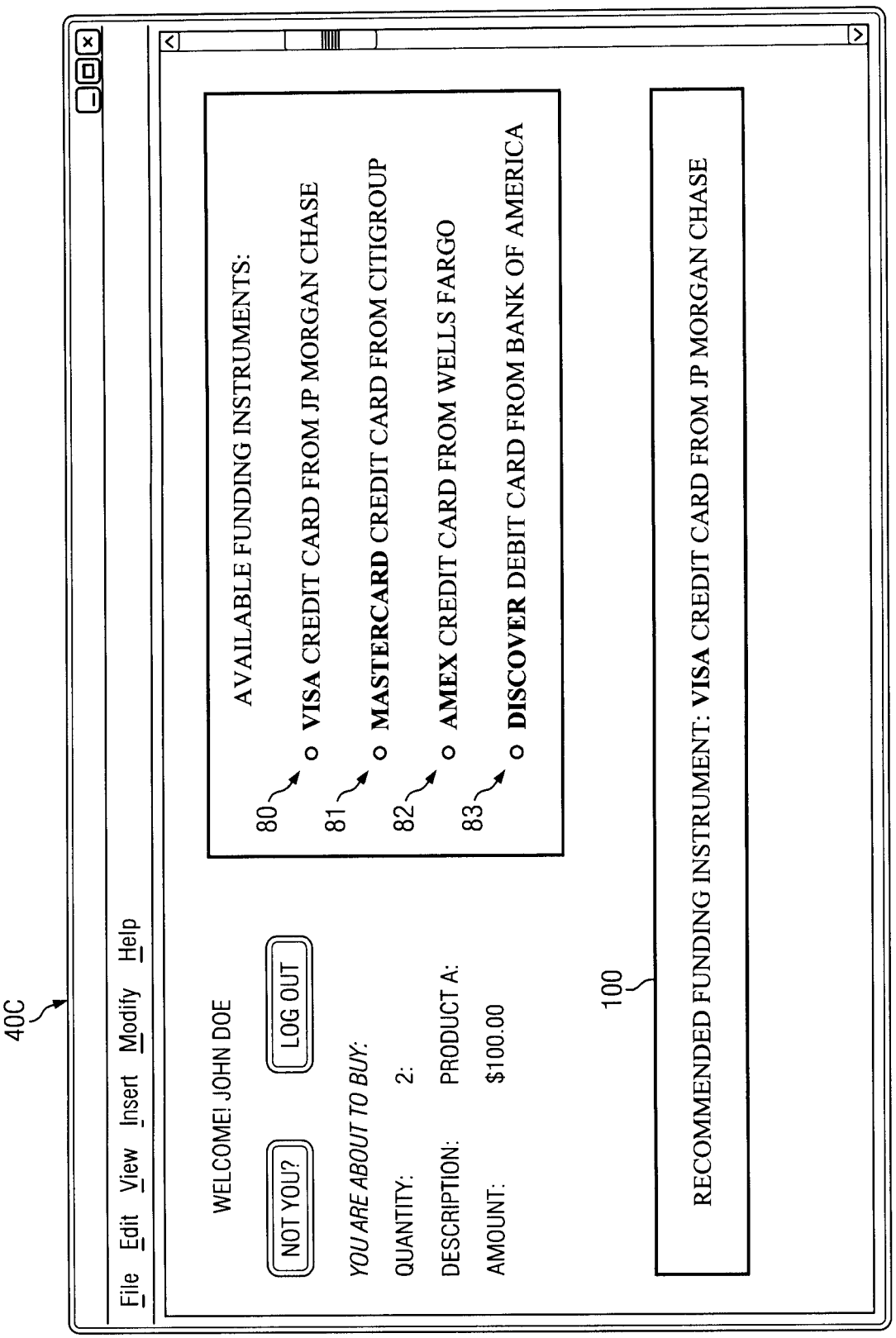

FIG. 3 illustrates an example of a user interface 40C in a payment management phase of the transaction. The user interface 40C may be displayed once a returning user correctly inputs his login information in the user interface 40B shown in FIG. 2, or after a new user successfully completes initial registration. As part of the initial registration, the new user (the prospective buyer) may be prompted to register one or more funding instruments (also referred to as funding sources) that may be linked with his account. The returning user had already completed this step at some point in the past. These funding instruments may be issued by different entities and may be different types of financial instruments.

As examples shown in FIG. 3, the prospective buyer may have funding instruments 80-83 that respectively include: a VISA® credit card issued by JP MORGAN CHASE®, a MASTERCARD® credit card issued by CITIGROUP®, an AMERICAN EXPRESS® credit card issued by WELLS FARGO®, and a DISCOVER® debit card issued by BANK OF AMERICA®. In other examples, the funding instruments may include a checking account, a savings account, a brokerage account, a line of credit, or any other suitable instrument from a financial institution.

The funding instruments 80-83 each have a different billing cycle (also referred to as a billing period or a payment cycle). In an embodiment, the billing cycle is calculated from a previous billing statement issue date to the subsequent statement issue date. For example, the VISA® credit card 80 may have a billing statement issue date that is on the first day of every month (e.g., January $1^{st}$). The subsequent statement issue date would be the first day of the next month (e.g., February $1^{st}$). In that case, the billing cycle is 31 days. The billing cycle for this embodiment may range from 28 to 31 days, depending on the specific months involved.

In another embodiment, the billing cycle is calculated from a previous billing statement issue date to the end of a payment grace period after a subsequent statement issue date. A payment grace period is a predetermined penalty-free period of time (usually about two to three weeks) after the subsequent statement issue date. That is, as long as a payment is made within the payment grace period, the card holder will not incur any penalties. Using the same example above, the holder of the VISA® credit card 80 receives a credit card statement issued on February $1^{st}$ for his purchases made in the month of January. The card holder may have until February $15^{th}$ (if the payment grace period is two weeks) or February $22^{nd}$ (if the payment grace period is three weeks) to pay the credit card statement without penalties. In that case, the billing cycle is either 45 days (for a two-week payment grace period) or 52 days (for a three-week payment grace period). The billing cycle for this embodiment may range from 42 to 45 days, or from 49 to 52 days, depending on the specific months.

Conventional online shopping sites typically do not make a recommendation to the prospective buyer as to which funding instrument should be used to complete the transaction. The prospective buyer is allowed to randomly choose one of the funding instruments 90-83 to pay for his purchase. Such random selection fails to take into account of the payment date (or transaction date) of the purchase and the respective billing cycles of the funding instruments 80-83 and may lead to some disadvantages.

One disadvantage is reduced days of free working capital. Free working capital is one of the benefits conferred by using a credit card. In more detail, a credit card holder can make purchases using the card but need not pay for these purchases until a credit card statement is issued. For example, if a buyer purchases a computer on January 2010 without using a credit card, he would normally have to pay for the computer on the same date. On the other hand, if the buyer uses a credit card to pay for the computer (still bought on January 2010), and the credit card statement is issued on January 25, then the buyer does not have to pay for the computer purchase until January 25. If the credit card has a payment grace period of three weeks, then the buyer does not have to pay for his computer purchase until February 2015, which amounts to a total of 36 days between the date of purchase and the date of payment for the purchase. During this period, the buyer enjoys the benefit of having the computer without paying for it. It is as if the buyer received an interest-free loan for this period. In this manner, the buyer receives 36 days of free working capital.

Still using the same example, suppose the buyer has the credit card with the statement date on January 25 with a three-week payment grace period as well as another credit card with a statement date on January 2011 with no payment grace period. If the buyer randomly chose the latter credit card as his payment source, then he would have to pay for his computer purchase on January 2011, which is only a day after the date of purchase. As such, the period of free working capital is reduced to just one day, instead of 36 days had the buyer chosen the credit card with the statement date of January 25. Even if the latter credit card has a three-week payment grace period, the buyer would still have to pay for the computer purchase before January 22, which corresponds to 22 days of free working capital—still less than the 36 days of free working capital associated with using the other credit card.

Another disadvantage of randomly choosing a funding source is reduced credit score. A person's credit score is a numerical expression based on a statistical analysis of a person's credit files to represent the creditworthiness of that person. Debt level is one of the factors influencing a person's credit score. Debt level may be reflected in terms of credit utilization, which is the amount of debt a person owes in comparison to the person's credit limits. If the credit utilization becomes too high—the amount of debt approaches the credit limits—the person's credit score begins to drop. As an example, if a credit card holder carries a balance of 80% of his credit limit for the card, his credit score will likely be lower than if he carries a balance of 20% of his credit limit. Hence, to improve one's credit score, it is prudent not to exceed a certain percentage of any given card's credit limit. This certain percentage may be predetermined, and may vary from about 30% to about 50%, for example.

Suppose a user has credit A that has a credit limit of 1,000 dollars and carries a balance of 700 dollars (70% of credit limit), as well as a credit card B that has a credit limit of 1,000 dollars and carries a balance of 100 dollars (10% of credit limit). If the user randomly chose credit card A as his payment source, he will hurt his credit score because the credit utilization is already too high on credit card A. Credit card B would have been a better choice since the credit utilization is much lower on that card, and adding an additional purchase to the balance on credit card B will likely not hurt the user's credit score.

From the above discussions, it can be seen that allowing the buyer to randomly choose a funding instrument to pay for his purchase may not be optimal with respect to free working capital and credit score. In comparison, the present disclosure discloses a financial transaction management scheme that optimizes the period of free working capital for the buyer and/or improves the buyer's credit score.

According to the present disclosure, when the buyer initiates the check out phase, the online shopping site receives a request from the user to make a payment for the purchase. The purchase has a billing date, which can be the same as the date of transaction. The billing date may include a payment deadline, which is the last date the payment must be made to avoid cancellation of the purchase.

Through the login information supplied by the user, the online shopping site identifies the user as well as the funding instruments (e.g., funding instruments 80-83) associated with the user's account. The online shopping site retrieves the respective billing cycles for each of the funding instruments. Using the example shown in FIG. 3, the VISA® card 80 has a statement issue date on the $1^{st}$ of every month, the MASTERCARD® card 81 has a statement issue date on the $8^{th}$ of every month, the AMERICAN EXPRESS® card 82 has a statement issue date on the $15^{th}$ of every month, and the DISCOVER® card 83 has a statement issue date on the $22^{nd}$ of every month. The user may provide payment due dates of the various funding instruments.

The online shopping site compares the billing date of the purchase with the respective billing cycles of the cards 80-83 and recommends one of the cards to the buyer. In more detail, the online shopping site compares the statement issue dates of the cards 80-83 and finds the card having the statement issue date that is the most immediate (among all the cards) prior to the billing date of the buyer's purchase. According to one embodiment, this may be done by identifying a subset of cards that have statement issue dates that occur before the billing date of the purchase. Then from that subset of cards, the card with the statement issue date that is the closest to the billing date is selected as the optimal card to be recommended.

To illustrate this concept with the example shown in FIG. 3, if the purchase has a billing date that is between the $1^{st}$ and the $8^{th}$ of a particular month, for example the $5^{th}$, the online shopping site will recommend the card 80 as the optimal funding instrument to the user. If the purchase has a billing date that is between the $9^{th}$ and the $15^{th}$ of a particular month, for example the $12^{th}$, the online shopping site will recommend the card 81 as the optimal funding instrument to the user. If the purchase has a billing date that is between the $16^{th}$ and the $22^{nd}$ of a particular month, for example the $19^{th}$, the online shopping site will recommend the card 82 as the optimal funding instrument to the user. If the purchase has a billing date that is between the $22^{nd}$ and the last day of a particular month, for example the $25^{th}$, the online shopping site will recommend the card 82 as the optimal funding instrument to the user. These recommendations may be displayed in the user interface 40C as an on-screen message 100. In some embodiments, the online shopping site may also automatically select the recommended funding instrument as a default payment source without requiring explicit user approval. This may be done in addition to, or instead of, displaying the on-screen message 100.

The recommended funding instrument according to the present disclosure offers the greatest available number of days of free working capital. Among all the buyer's funding instruments, the recommended funding instrument has the closet statement date preceding the billing date of the purchase. Consequently, it offers the buyer the longest amount of time (compared to all the other cards) before the buyer has to pay for the purchase. As an example, assuming the cards 80-83 each have a three-week payment grace period. If the billing date for the purchase is on January 5, the optimal funding instrument would be card 80, which would offer the buyer 48 days of free working capital (27 days till the next statement date+21 days of payment grace period=48 days). In comparison, cards 81-83 would respectively yield 41 days, 34 days, and 27 days of free working capital.

Considering all of the buyer's purchases and all of the available funding instruments collectively, the number of days of free working capital can be calculated using the following equation:

$$\text{total number of days of free working capital} = N^*(1-1/X)$$

where N=the number of days in the billing cycle+the number of days in the payment grace period, and X=number of available funding instruments.

The above equation suggests that the number of days of free working capital increases as there are more funding instruments available. However, each online shopping site may decide to limit the number of funding instruments to a manageable number (e.g., less than 10) for ease of management. Furthermore, to ensure the above equation holds true, the statement issue dates of the funding instruments should be spaced apart as evenly as possible. This can be done at the buyer's request to the issuer of each funding instrument. For example, the buyer may request a statement issue date to fall on the $1^{st}$ of every month when he applies for the VISA® card 80, and request a statement issue date to fall on the $8^{th}$ of every month when he applies for the MASTERCARD® card 81, etc. According to an embodiment of the present disclosure, the online shopping site may make such recommendation (spacing apart its funding instruments as evenly as possible) to its users.

It is advantageous for the buyer to use the recommended funding instrument to pay for the purchases. It is understood, however, that different embodiments of the present disclosure may offer other advantages, and that no particular advantage is required for all embodiments. In one aspect, having free working capital allows the buyer to allocate extra funds—funds that would have been used to pay for the purchases—in an interest-bearing account, so that the buyer can earn interest that would not otherwise have been earned.

In another aspect, the payments are more evenly distributed or "spread out," as a plurality of funding instruments (as opposed to any given one) are utilized to pay for all of the buyer's purchases. The distribution of payments may make payment management easier for the buyer. For example, it may be easier to manage four smaller payments of $300 each, than to manage a larger payment of $1,200. This may be especially true for buyers who live from pay check to pay check, or for buyers who do not have good financial management skills (e.g., those who do not save and routinely spend whatever available funds he has in his accounts). For these buyers, it may be more difficult to furnish a large sum of money at one time in a month, but it may be easier for them to furnish a smaller amount of money multiple times throughout the month.

In yet another aspect, using multiple credit cards simultaneously may help improve the buyer's credit score. As the buyer manages multiple credit cards and makes on-time payments for each card, he is proving that he is a responsible person and is credit-worthy. In comparison, using only a single credit card may not establish enough statistical data to sufficient prove the creditworthiness of the buyer. In addition, dividing the total amount of purchase among multiple credit cards means that each card will have a smaller rate of credit utilization, which also helps improve one's credit score.

In some alternative embodiments of the present disclosure, the funding instruments may be recommended based on other "rules." For example, instead of automatically recommending the funding instrument with the most immediate preceding statement issue date to the billing date of the purchase, the recommendation may be based on the credit utilization rate of each card. Stated differently, the online shopping site may be configured to retrieve the credit balance information (with the buyer's consent) and compare each credit card's credit utilization rate with the other cards. The credit card having the lowest credit utilization rate may be recommended to the buyer. This embodiment allows the buyer to manage credit cards having more evenly distributed balances and also helps improve the buyer's credit score, for reasons similar to those discussed above. This embodiment may also be combined with the embodiment discussed above. For example, the "rule" can dictate that in case two credit cards have identical or substantially similar (e.g., one or two days apart) statement issue dates, then the card with the lower credit utilization rate should be recommended to the buyer as the funding instrument. Another rule, alone or in combination, may be to look at any accounts that have a balance not fully paid off from the previous billing cycle. Such funding sources may be disfavored over ones where the balance has been paid in full from the previous billing cycle.

In other alternative embodiments, some of the funding instruments may be designated as the primary funding instruments of the buyer's account, while other funding instruments may be designated as secondary (or backup) funding instruments. That is, the primary funding instruments should be used as the first options, and the secondary funding instruments should be used when a set of predetermined criteria has been met. As an example, referring to FIG. 3, the cards 80-82 may be designated as primary funding instruments, and the card 83 may be designated as a secondary funding instrument. Therefore, the cards 80-82 should be used unless predetermined criteria has been satisfied. For instance, the predetermined criteria may be satisfied when the credit utilization rates for the primary funding instruments each exceed 50%. In that case, the online shopping site may recommend the backup funding instrument—the card 83—to be uses as the funding instrument to complete the purchase.

Although an online shopping site is used herein as an example entity that can recommend an optimal funding instrument to a user, it is understood that the same functionality may be implemented for other types of entities in accordance with various aspects of the present disclosure. For example, such functionality may be implemented for a third party payment platform (or payment provider). The buyer (or user of the third party payment platform) may have an account with the third party payment platform and may send the payment request to the third party payment platform after a purchase is made. The third party payment platform will analyze the user's funding instruments on file and recommend an optimal funding instrument to the user. The recommendation may be made based on factors such as the respective billing cycles of the user's funding instruments, the billing date of the purchase, credit utilization rates of the funding instruments, etc. The recommendation may be in the form of a message displayed to the user, in which the user can make an informed decision as to which funding instrument to choose. The recommendation may also be an automatic selection of the deemed optimal funding instrument. In other words, the payment may be made seamlessly without explicitly requesting the user to make a selection.

The capability to recommend an optimal funding instrument according to various aspects of the present disclosure discussed above may also be implemented for entities such as banks, financial management service providers, or other suitable institutions. It is also understood that the recommendation need not be for payment of an online purchase, which is merely used as an example to illustrate one form of a bill according to the various concepts of the present disclosure. The recommendation may be made for a pending payment of an electricity bill, a cable bill, a telephone bill, a medical bill, a mortgage, or another suitable bill or purchase.

Although the above has described the online shopping site determining the "best" funding source and providing the recommendation to the user, other entities may provide the same service. For example, a payment provider, such as PayPal, Inc. of San Jose, Calif., may provide a similar service. In this case, when the user is ready to make a payment through the payment provider, the payment provider will determine what funding instructions are associated with the user's account. The payment provider may then provide recommendations within the funding sources. This provides the same advantages described above, since the payment provider then charges the appropriate funding source for the most free working capital or other considerations described above. Even if the user is paying directly with another funding instrument (and not with the user's payment provider account), the payment provider may still provide the recommendations described above.

Also, when the user is making a purchase at a physical point of sale, such as through the user's mobile device, the user may be presented with the same recommendations as discussed above, although through the user's mobile device. In that case, when the user is ready to make a payment, the same or similar information is transmitted to the payment provider, who then processes the information to determine the "best" recommendation as to a specific funding instrument with which to pay the transaction.

Figure 4:
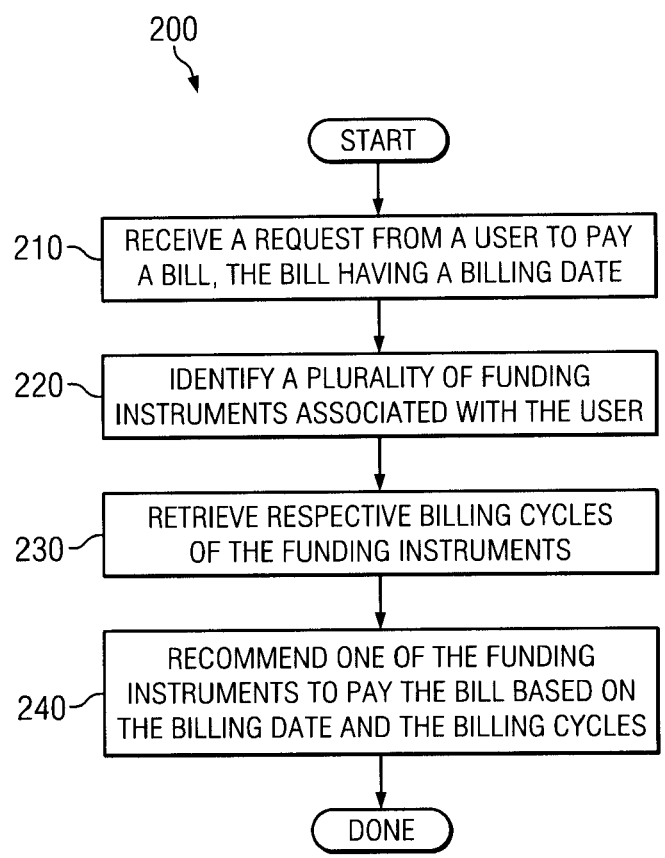
FIG. 4 illustrates a flowchart of various process flows according to various aspects of the present disclosure.

FIG. 4 is a flowchart illustrating a method 200 for performing a financial transaction according to one embodiment. The method 200 includes block 210 in which a request to pay a bill is received. The payment request may come from a user. The request may be received by the seller or merchant, or a payment provider, in this embodiment and others described herein. The bill has a billing date or a payment deadline. The method 200 includes block 220 in which a plurality of funding instruments available for paying the bill are identified. These funding instruments may be different credit cards. The method 200 includes block 230 in which respective billing cycles of the funding instruments are retrieved. Each billing cycle is measured from the statement issue date. The funding instruments have different billing cycles (different statement issue dates). The method 200 includes block 240 in which one of the funding instruments to pay the bill is recommended. The recommendation is made based on the billing date and the billing cycles. In an embodiment, the funding instrument with the billing cycle that most immediately precedes the billing date is recommended to a user.

Figure 5:
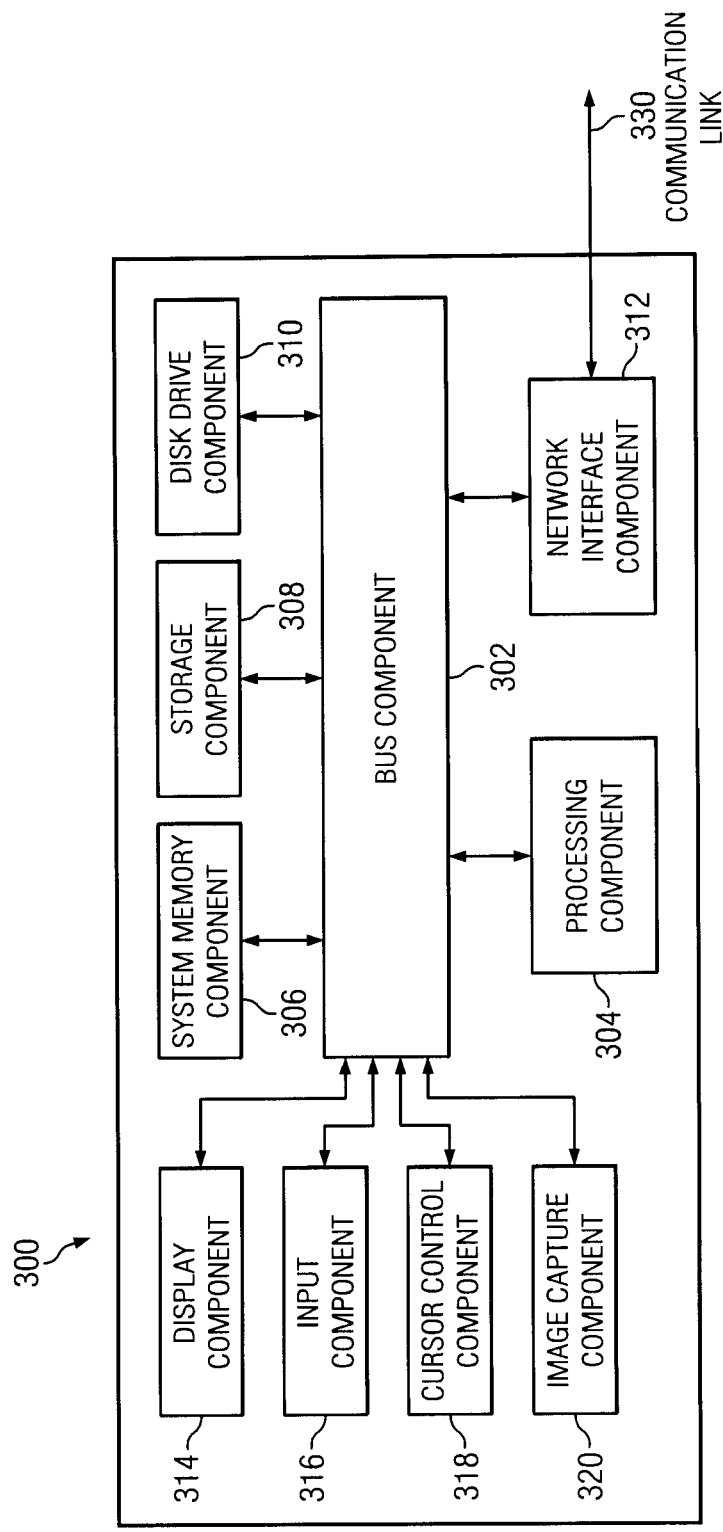
FIG. 5 shows a block diagram of a computer system for implementing various methods and devices described according to various aspects of the present disclosure.

FIG. 5 is a block diagram of a computer system 300 suitable for implementing various methods and devices described herein, for example, the various method blocks of the method 200. In various implementations, user devices (such as managed by the prospective buyer) may comprise a network communications device (e.g., mobile cellular phone, laptop, personal computer, etc.) capable of communicating with a network, and a service provider device (such as managed by a third party payment platform) may comprise a network computing device (e.g., a network server). In other implementations, it should be appreciated that the service provider device may comprise a network communications device (e.g., mobile cellular phone, laptop, personal computer, etc.) capable of communicating with the network, without departing from the scope of the present disclosure. Accordingly, it should be appreciated that each of the devices may be implemented as the computer system 300 for communication with the network in a manner as follows.

In accordance with various embodiments of the present disclosure, the computer system 300, such as a mobile communications device and/or a network server, includes a bus component 302 or other communication mechanisms for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., cathode ray tube (CRT) or liquid crystal display (LCD)), input component 316 (e.g., keyboard), cursor control component 318 (e.g., mouse or trackball), and image capture component 320 (e.g., analog or digital camera). In one implementation, disk drive component 310 may comprise a database having one or more disk drive components.

In accordance with embodiments of the present disclosure, computer system 300 performs specific operations by processor 304 executing one or more sequences of one or more instructions contained in system memory component 306. Such instructions may be read into system memory component 306 from another computer readable medium, such as static storage component 308 or disk drive component 310. In other embodiments, hard-wired circuitry may be used in place of (or in combination with) software instructions to implement the present disclosure.

Logic may be encoded in a computer readable medium, which may refer to any medium that participates in providing instructions to processor 304 for execution. Such a medium may take many forms, including but not limited to, non-volatile media and volatile media. In one embodiment, the computer readable medium is non-transitory. In various implementations, non-volatile media includes optical or magnetic disks, such as disk drive component 310, and volatile media includes dynamic memory, such as system memory component 306. In one aspect, data and information related to execution instructions may be transmitted to computer system 300 via a transmission media, such as in the form of acoustic or light waves, including those generated during radio wave and infrared data communications. In various implementations, transmission media may include coaxial cables, copper wire, and fiber optics, including wires that comprise bus 302.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 330 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 330 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of performing financial transactions, comprising:

receiving a request to pay a bill, the bill having a billing date;

identifying a plurality of funding instruments available for paying the bill;

determining respective credit utilization rates of the funding instruments;

retrieving respective billing cycles of the funding instruments, wherein for each funding instrument, its billing cycle is calculated from a previous billing statement issue date to one of: a subsequent statement issue date, and an end of a payment grace period after the subsequent statement issue date; and recommending, electronically by a processor, one of the funding instruments to pay the bill, wherein the recommending is carried out at least in part based on the billing date of the bill and the respective billing cycles of the funding instruments, wherein the recommending comprises:

comparing the billing date of the bill with the respective billing cycles of the plurality of funding instruments;

selecting, from the plurality of funding instruments, a funding instrument having a billing cycle that most immediately precedes the billing date;

recommending the selected funding instrument if the selected funding instrument has a credit utilization rate that is less than a predetermined rate; and recommending a different funding instrument having a credit utilization rate that is less than the predetermined rate if the selected funding instrument has a credit utilization rate that is no less than a predetermined rate.

2. The method of claim 1, wherein the receiving, the retrieving, and the associating are each carried out using a computer hardware device encoded with software instructions.

3. The method of claim 1, wherein the selecting is carried out so that the statement issue date of the selected funding instrument occurs before the billing date by a smaller amount than the respective statement issue dates of the other funding instruments.

4. The method of claim 1, wherein the recommending comprises automatically selecting one of the plurality of funding instruments to pay the bill.

5. The method of claim 1, wherein the funding instruments each comprise a credit card.

6. The method of claim 1, further comprising: prompting a user to register the plurality of funding instruments in a manner such that the funding instruments have respective billing cycles that are spaced apart from one another.

7. An apparatus comprising a non-transitory, tangible computer readable storage medium storing a computer program, wherein the computer program has instructions that when executed, perform:

receiving a request to pay a bill, the bill having a billing date;

prompting a user to register the plurality of funding instruments in a manner such that the funding instruments have respective billing cycles that are spaced apart from one another;

identifying the plurality of funding instruments registered by the user in response to the prompting and that are available for paying the bill;

retrieving respective billing cycles of the funding instruments, wherein for each funding instrument, its billing cycle is calculated from a previous billing statement issue date to one of: a subsequent statement issue date, and an end of a payment grace period after the subsequent statement issue date; and recommending one of the funding instruments to pay the bill, wherein the recommending comprises:

comparing the billing date of the bill with the respective billing cycles of the plurality of funding instruments;

selecting, from the plurality of funding instruments, a funding instrument having a billing cycle that most immediately precedes the billing date;

recommending the selected funding instrument if the selected funding instrument has a credit utilization rate that is less than a predetermined rate; and recommending a different funding instrument having a credit utilization rate that is less than the predetermined rate if the selected funding instrument has a credit utilization rate that is no less than a predetermined rate.

8. The apparatus of claim 7, wherein the instructions for the recommending comprise instructions for:

comparing the billing date of the bill with the respective billing cycles of the plurality of funding instruments;

selecting, from the plurality of funding instruments, a funding instrument having a billing cycle that most immediately precedes the billing date; and recommending the selected funding instrument.

9. The apparatus of claim 8, wherein each billing cycle is measured from a statement issue date, and wherein the instructions for the selecting are executed in a manner so that the statement issue date of the selected funding instrument occurs before the billing date by a smaller amount than the respective statement issue dates of the other funding instruments.

10. The apparatus of claim 8, wherein the computer program comprises further instructions that when executed, carry out: determining respective credit utilization rates of the funding instruments; and wherein the instructions for the selecting and the recommending comprise:

if the selected funding instrument has a credit utilization rate that is less than a predetermined rate, then the selected funding instrument is recommended; and if the selected funding instrument has a credit utilization rate that is no less than a predetermined rate, then a different funding instrument having a credit utilization rate that is less than the predetermined rate is recommended.

11. The apparatus of claim 7, wherein the instructions for the recommending comprises instructions for automatically selecting one of the plurality of funding instruments to pay the bill.

12. The apparatus of claim 7, wherein the funding instruments each comprise a credit card.

13. A system, comprising:

means for receiving a request to make a payment, the payment having a payment deadline;

means for prompting a user to register the plurality of funding sources in a manner such that the funding sources have different payment deadlines;

means for identifying the plurality of different funding sources registered by the user in response to being prompted;

means for determining a credit utilization rate for each identified funding source, means for retrieving billing period information associated with each identified funding source, the billing period information including a billing cycle that is calculated from a previous billing statement issue date to one of: a subsequent statement issue date, and an end of a payment grace period after the subsequent statement issue date; and means for recommending using one of the identified funding sources to make the payment, wherein the means for recommending includes means for:
  comparing the payment deadline with the respective billing period information of the identified funding sources;
  comparing the respective credit utilization rates of the identified funding sources;
  selecting, from the plurality of funding source, a funding source having a billing cycle that most immediately precedes the payment deadline;
  recommending the selected funding source if the credit utilization rate of the selected funding source is less than a predetermined rate; and
  recommending a different funding source having the credit utilization rate that is less than the predetermined rate if the credit utilization rate of the selected funding source is no less than a predetermined rate.

14. The system of claim 13, wherein the means for recommending comprises:
  means for identifying, from the plurality of the funding sources, a subset of funding sources whose respective billing periods begin before the payment deadline; and
  means for selecting and recommending, from the subset of the funding sources, a funding source whose billing period begins the latest among the subset of the funding sources.

15. The system of claim 13, wherein the credit utilization rate measures an amount of debt owed on a funding source in comparison with a credit limit of the funding source.

16. The system of claim 15, wherein the means for recommending comprises means for recommending a funding source that has a billing period preceding the payment deadline and a credit utilization rate below a predetermined threshold.

17. The system of claim 13, wherein the means for recommending comprises means for automatically making the payment using one of the funding sources.

18. The method of claim 1, wherein the credit utilization rate measures an amount of debt carried by the funding instrument in comparison with a credit limit of the funding instrument.

19. The method of claim 6, wherein the respective billing cycles are spaced apart as evenly as possible.

20. The apparatus of claim 10, wherein the credit utilization rate measures an amount of debt carried by the funding instrument in comparison with a credit limit of the funding instrument, and wherein the prompting comprises prompting the user to register the plurality of funding instruments whose respective billing cycles are spaced apart as evenly as possible from one another.

* * * * *